United States Patent Office 3,420,797
Patented Jan. 7, 1969

3,420,797
PROCESS OF PRODUCING POLYOXYMETHYLENES WITH HIGH MOLECULAR WEIGHTS
Shinichi Ishida and Hiroshi Ohama, Tokyo, Japan, assignors to Asahi Kasei Kogyo Kabushiki Kaisha, Osaka, Japan, a corporation of Japan
No Drawing. Filed Dec. 1, 1964, Ser. No. 415,165
Claims priority, application Japan, Dec. 3, 1963, 38/64,647
U.S. Cl. 260—67
Int. Cl. C08g 1/02
5 Claims

ABSTRACT OF THE DISCLOSURE

A process in which paraformaldehyde is heated in a closed system in the presence of a sulfoxy catalyst to produce a modified polyoxymethylene of higher molecular weight which is decomposed to produce formaldehyde which in turn is polymerized to yield high molecular weight polyoxymethylene having great thermal stability.

---

This invention relates to a process of producing polyoxymethylenes with high molecular weights and excellent thermal stability from formaldehyde. More particularly, this invention relates to a process of producing formaldehyde to be used in the polymerization.

It is well known that formaldehyde yields polyoxymethylene when polymerized, and substantially anhydrous preparations of formaldehyde only will yield polyoxymethylenes with excellent thermal stability and high molecular weights, suitable as materials of shaped products, when they are caused to polymerize in the presence of a catalyst such as amines, organo-metallic compounds and other suitable compounds.

The degree of polymerization of the resulting polyoxymethylenes varies according to the water content of the starting formaldehyde: when the water content is higher, the products such as α-polyoxymethylenes have lower molecular weights; when the water content is lower, the products have higher molecular weights.

Although formaldehyde usually may be obtained by heating and decomposing paraformaldehyde or solid polyoxymethylene with low molecular weights such as α-polyoxymethylene, the resulting gaseous formaldehyde which contains impurities such as water, formic acid and methanol must be purified to an extremely high purity, preferably to a nearly anhydrous state, for obtaining polyoxymethylenes with high molecular weights, suitable as a material of shaped products, for example, having an intrinsic viscosity of 0.8–1.5 and higher and also excellent thermal stability.

For this reason, a variety of methods have been proposed with the purpose of purifying formaldehyde. For example, the processes of passing gaseous formaldehyde through multiple refrigerating traps to purify by condensing; of washing, by contacting same with a polyalkylene glycol ester at a temperature above 100° C.; of liquefying and distilling; and, of preliminarily polymerizing gaseous formaldehyde have been developed. However, these processes invariably have disadvantages and difficulties such as loss of formaldehyde, complicated equipment and recovery steps, clogging of conduits difficult operation and high expenditure.

However, according to the process of the present invention, even low molecular weight polyoxymethylenes particularly paraformaldehyde which will give nothing more than the preparation of formaldehyde with such a low grade of purity as to be quite unsuitable for producing polyoxymethylenes with high molecular weight, when polymerized without any preliminary treatment, may be successfully converted into a modified polyoxymethylene with moderately high molecular weight and low water content by heating in the presence of a derivative containing sulfur oxidized to various states which will be hereinafter described.

More surprisingly, we have found that formaldehyde obtained by heating and decomposing the thus modified paraformaldehyde have high purity and extremely low water content, yields polyoxymethylene with extremely high molecular weight, excellent thermal stability, and good shaping property, even when polymerized directly without using any preliminary treatment.

Thus, the present invention provides two novel steps that may be employed commercially.

The first is to provide a simplified and practical step of producing modified paraformaldehydes or polyoxymethylenes capable of yielding pure formaldehyde with such quality as may be used for producing polyoxymethylenes with high molecular weight, by starting from thermally unstable polyoxymethylenes containing much impurities and inferior in quality as well as molecular weight, particularly from commercial paraformaldehyde.

The second is to provide a step of producing polyoxymethylenes with improved thermal stability and high molecular weight very suitable as a material of shaped products, characterized by heat decomposing the thus modified paraformaldehyde or polyoxymethylenes to gaseous formaldehyde and polymerizing the formaldehyde by usual methods.

The first step may be carried out by heating low molecular weight polyoxymethylene or commercial paraformaldehyde preferably those with a water content lower than 5%, to 50°–200° C., preferably to 80°–160° C. in an organic solvent containing one or two kinds of the members, selected from the group to be mentioned below, in a closed system. Compounds having the general Formulas A and B (A) 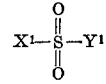

wherein $X^1$ represents $R_1—$, $R_1O—$, $R_1NH—$, $R_1R_2N—$ and $Y^1$ represents

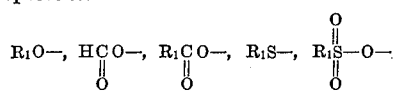

wherein $R_1$ and $R_2$ are independently selected from the group consisting of alkyl group, aryl group, aralkyl group, members of said groups being substituted with at least one organic functional group constituted of at least one element selected from the group consisting of Cl, N, O and S, and wherein $X^1$ and $Y^1$ may form a ring.

(B) 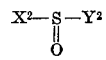

wherein $X^2$ represents $R_1—$, or $R_2O—$, and $Y^2$ represents $—OH$, $—OR_3$ or

when $X^2$ is $R_1—$, and $Y^2$ represents $—OR_5$ or halogen when $X^2$ is $R_2O$, wherein $R_1$, $R_2$, $R_3$ and $R_5$ are independently selected from the group consisting of alkyl group, aryl group or aralkyl group, members of said groups being substituted with at least one organic functional group constituted of at least one element selected from the group consisting of H, Cl, N, O, S and C, $R_4$ is selected from the group consisting of aryl group and aryl group substituted with said organic functional group, when $Y^2$ is

$R_1$ and $R_4$ are the same, and when $Y^2$ is halogen, there is excluded from the definition of $R_2$ aryl groups or aryl groups substituted with said organic functional group, and $X^2$ and $Y^2$ may form a ring. Such treatment produces modified paraformaldehydes or polyoxymethylenes with an intrinsic viscosity from 0.4 to about 0.8.

One of the modifications effected by this treatment appears as an increase of the molecular weight: while paraformaldehyde is considered to be a low molecular weight polyoxymethylene with a polymerization degree of 6–100, very susceptible to heat decomposition and with a viscosity so low as to be unmeasurable or to give only a small value if measured, the polyoxymethylenes modified according to the process of the present invention possess viscosities that may be definitely measured in p-chlorophenol, dimethylformamide or γ-butyrolactone. Furthermore, the solubility markedly differed from each other: while the starting lower molecular weight polyoxymethylenes and paraformaldehyde are partly soluble in water or acetone and soluble in aqueous alkalis and diluted acids, the modified polyoxymethylenes obtained according to the process of invention are quite insoluble in these media. Changes in melting point were also observed: starting from an unstable material with a melting point from 120° to 170° C., there was obtained higher polyoxymethylene with a sharp melting point in the range from 168° to 170° C. by the modifying treatment according to the process of the present invention. Still further, the water content of the modified polyoxymethylene decreased to only a few fractions of that of the starting materials.

The above described process of modification may be shown in more detail as follows.

The examples of catalysts usable in the present invention are sulfonic acids, sulfinic acids and derivatives thereof such as sulfinic halides and esters of sulfuric acid and sulfurous acid.

The former group comprises sulfonic anhydrides such as benzenesulfonic anhydride and naphthalenesulfonic anhydride, methyl-, ethyl-, propyl-, isopropyl-, butyl- and other alkyl-, esters, alcycyclic esters such as cyclohexyl ester, aralkyl esters such as benzyl ester, aryl esters such as phenyl ester, β-chloroethyl ester, β-hydroxybutyl ester, β-mercaptoethyl ester, β-nitroethyl ester, β-hydroxybutyl ester and other substituted alkyl esters, substituted aryl esters such as p-nitrophenyl ester of benzenesulfonic acid and corresponding esters of m-nitrobenzenesulfonic acid, p-nitrobenzenesulfonic acid, 2,4-dinitrobenzenesulfonic acid, p-chlorobenzenesulfonic acid, m-alkoxysulfonic acid, p-bromobenzenesulfonic acid, p-hydroxybenzenesulfonic acid, p-aminobenzenesulfonic acid, 1,3-benzenedisulfonic acid, α-sulfopropionic acid, sulfobenzoic acid, methanesulfonic acid, ethanesulfonic acid, 1,2-ethanedisulfonic acid, 1,3-propanesulfonic acid, 1,4-butanedisulfonic acid and ethylenesulfonic acid; sulfo anhydrides and sulfocarboxylic anhydride, such as sulfones, o-sulfobenzoic anhydride, and sulfoacetic anhydride; alkyl sulfates (esters of sulfuric acid) such as dimethylsulfate, diethylsulfate and di-n-propylsulfate; alkyl- and aryl esters of alkyl- or aryl thiosulfonic acid such as alkyl- or aryl esters of ethylthiosulfonic acid and toluenesulfonic acid; and, esters of alkyl- or arylthiosulfuric acid such as alkyl- or aryl esters of ethylthiosulfuric acid and benzenethiosulfuric acid.

The latter group comprises sulfinic acids such as benzenesulfinic acid, butanesulfinic acid, p-chlorobenzenesulfinic acid, toluenesulfinic acid, m-nitrobenzenesulfinic acid, 2-hydroxybenzoic- and sulfinic acids, p-aminobenzenesulfinic acid and α-anthraquinonesulfinic acid and methyl-, ethyl-, benzyl-, cyclohexyl-, phenyl- and other alkyl and aryl esters thereof; sulfinyl halides preferably chloride such as benzenesufinyl chloride and toluenesulfinyl iodide; sulfinic anhydride such as benzenesulfinic anhydride and toluenesulfinic anhydride; methyl-, ethyl-, benzyl-, cyclohexyl-, phenyl- and other esters of chlorosulfinic acid; and, dimethyl-, diethyl-, di-n-propyl-, diisopropyl and other esters of sulfurous acid.

These catalysts are used in amounts from 0.0001 ($10^{-4}$)–5% by weight, preferably $10^{-3}$–0.5% by weight of the starting polyoxymethylene. The amount of the catalyst may be used directly or by blending with a reaction medium to be employed in the reaction or by dispersing or dissolving in a medium or a solvent. Otherwise, a dispersion or a solution containing the catalyst in a medium may be added to or sprayed on the paraformaldehyde to be treated. This treatment may be carried out either in bulk or in an organic medium. The organic medium to be used should not destroy the activity of the catalyst employed, should be liquid at reaction temperatures, and should be stable per se and against formaldehyde under the treating conditions. For example, benzene, toluence, xylene, cyclohexane, methylcyclohexane, petroleum benzine, kerosene, naphtha and other hydrocarbons; diphenylether, anisole, dibutylether, dimethoxyethane, dimethyldiethyleneglycol, dioxane and other ethers; esters of carboxylic acid such as phenyl benzoate, methyl benzoate, methyl salycilate and methyl acetate; and, other organic solvents such as dimethylformamide, dimethylsulfoxide, dimethylacetamide and N-methylpyrolidone may be used as a medium in the treatment.

Although there is no limitation to the amount of these media, it is usually preferable to use an amount from 10 to 500% by weight of the polyoxymethylene to be treated.

The operative temperature is from 50° to 200° C., preferably from 50° to 160° C., as mentioned above. The temperature may be elevated stepwise during the course of the treatment. Since the treatment period varies according to the kind and amount of catalyst and the desired degree of modification, it should be selected in reference to a combination of these factors. However, the period from 0.5 to 24 hours is usually preferable.

That the treatment should be carried out in a closed system, though considered to be necessary for preventing the escape of formaldehyde, is one of the important requirements in the present invention.

Although the pressure in this closed system is elevated by the autogeneous pressure due to heating, a gas such as nitrogen may be pressurized into the system or the reaction may be caused to start in vacuo by interrupting the system from the outer zone.

Although we have yet not established theory concerning the mechanism of the modification according to the process of the present invention, polyoxymethylene with low molecular weight or paraformaldehyde used as a starting material of the present invention apparently undergoes the desired modification without changing its appearance. That is, lower molecular weight polyoxymethylene introduced into the modification reaction system does not decompose into formaldehyde to be polymerized again to the modified paraformaldehyde, but changes into the desired modified form while maintaining the appearance of white solid powder in the medium during the course of conversion.

Accordingly, while any appropriate reaction vessel may be employed for this conversion, an autoclave with or without a stirring device may be convenient. Also, if desired, a continuous process is possible using a tubular reactor.

As a starting material of the present invention, commercial formaldehyde with a purity as high as possible, usually with 85–95% and higher content of formaldehyde, may be used. Furthermore, paraformaldehydes with even higher water content and a purity of less than 95% by weight may be used after drying for reducing the water content to less than 6% by weight, preferably to less than 3% by weight by a conventional process. For example, commercial paraformaldehyde may be dried in vacuo or by washing with a dry, hydrophilic organic solvent such as nearly anhydrous alcohols, carboxylic anhydrides, ethers, esters, sulfoxides, ketones, lactones, amides and lactoms, e.g. methyl alcohol, ethyl alcohol, propyl alcohol, isopropyl alcohol, ethylene glycol dimethylether, ethyleneglycol diethyl ether, ethylene glycol diisopropyl ether, tetrahydrofurane, dioxane, dimethoxyethane, diethyleneglycol dimethyl ether, methyl cellosolve, acetic anhydride, propionic anhydride, methyl acetate, ethyleneglycol monoacetate, acetone, methyl ethyl ketone, diethyl ketone, γ-butyrolactone, propiolactone, dimethylsulfoxide, tetramethylenesulfoxide, dimethylformamide, dimethylacetamide and N-methylpyrolidone. A low molecular weight polyoxymethylene called α-polyoxymethylene also may be used.

The modified polyoxymethylenes, including those from commerical paraformaldehyde, are no longer paraformaldehyde per se, but a special group of polyoxymethylenes, insoluble in water, containing little or no part thereof soluble in dilute aqueous alkali, particularly in an aqueous sodium sulfite.

The thusly modified polyoxymethylene is treated with 10% aqueous sodium sulfite followed by washing with acetone or alcohol and drying. If desired, the product may be dissolved in p-chlorophenyl and caused to precipitate by adding a non-solvent such as methanol to recover polyoxymethylene or an acetate thereof, directly or after acetylation. Through this modifying treatment, the intrinsic viscosity increases a measurable range from 0.3 to 0.8.

At the final stage of this modifying treatment, the modified polyoxymethylene may be recovered. When the treatment comes to an end, water separated out of the starting polyoxymethylene, remains on the wall of the reactor and the surface of the polyoxymethylene, and disperses and dissolves into the medium, together with methanol, formic acid, methyl formate and other impurities. To remove these impurities, the solid phase is at first separated by suitable means such as drying, filtration, centrifugation and decantation, washed with a suitable liquid such as an alcohol, a ketone, a hydrocarbon, an ether or water and the solvent for the catalyst used and finally dried under normal or reduced pressure or in a stream of an inert gas.

The polyoxymethylene thus recovered has the appearance of white powder or flakes with little or no appreciable odor of formaldahyde.

The polyoxymethylenes with molecular weights in higher range acquires an excellent thermal stability when acetylated; a film or a sheet may be obtained therefrom by heating and melting between hot plates followed by cooling. However, the molecular weight usually is not yet high enough to be used for shaped products.

Another important feature of the present invention exists in that the thusly modified polyoxymethylene is heated so as to induce decomposition to formaldehyde, which is then converted to polyoxymethylene of much higher molecular weights. Unexpectedly, we have noted that formaldehyde caused to generate from the modified polyoxymethylene by heating contains no water and thus very easily yields polyoxymethylenes with excellent thermal stability and high molecular weights, when polymerized in a conventional polymeripation system.

Thus, we have established an industrially feasible process of producing useful polyoxymethylene requiring neither complicated equipment nor subtle operative conditions for dehydrating and purifying gaseous or liquified formaldehyde as had been a common practice in the conventional processes, by using the modified polyoxymethylene according to the present invention.

Any of the known processes may be employed for the heat decomposition. For example, powder, pellets or flakes of the modified polyoxymethylene may be easily decomposed by heating unprotected or protected with an inert gas or an inert organic vapor, or suspended in a medium of organic compound with high boiling point. If desired, a small amount of catalyst such as sulfuric acid, phosphoric acid or phosphoric anhydride may be present in the decomposing zone.

The temperature in the decomposing zone should be regulated to a value slightly higher than that in the modifying zone, usually in the range of 80° to 300° C., preferably in the range of 100° to 250° C.

The gaseous formaldehyde generated by the heat decomposition is sent to a polymerization zone through a conduit, preferably with a suitable carrier gas, though the conduit is rarely clogged owing to the high purity of the generated formaldehyde.

Thereafter, the gaseous formaldehyde is either liquefied by directly cooling or absorbed into a solvent, and polymerized.

The polymerization process per se is not the essential feature of the present invention: the polymerization may be effected according to conventional processes using catalysts such as various amines, ammonium compounds, organometallic compounds, carboxylic acids and their metal salts, isonitrile or organophosphorus compounds. It was found that the polyoxymethylenes produced by the present process have thermal stability, molecular weight and molding properties never inferior to those of the products obtained from formaldehyde strictly purified according to the conventional complicated processes. Furthermore, the present process is more advantageous than conventional processes in the point of simplified and easily controllable steps as well as the simplified equipment.

The present invention will be illustrated in still further detail while referring to the following specific examples, which should not be construed as limiting the spirit and the scope of the present invention defined in the claims.

So long as not otherwise specified, the amounts in the examples was represented in term of part by weight and the viscosity, in term of the solution viscosity $\eta_{sp}/C$ measured as a solution containing 1 g. of polymer in 100 ml. of p-chlorophenol as solvent at 60° C.

EXAMPLE 1

Commercial paraformaldehyde of 95% purity was soaked in anhydrous methanol for about 24 hours, filtered under suction and thoroughly washed with dry ether. One hundred parts of the paraformaldehyde thus treated, 50 parts of methyl cyclohexane and 0.125 part of ethyl m-dinitrobenzene sulfonate were mixed in a sealed tube and heated at 120° C. for 20 hours. After the end of the reaction, the contents of the tube were washed with ethanol and poured into 1000 ml. of a solution of sodium sulfite in water, and stirred and heated at 50° C. for one hour. The insoluble part was filtered under suction, thoroughly washed with water and dried overnight in vacuo. The yield of polyoxymethylene was 55.7 parts. The solution viscosity was 0.704 and the softening temperature was 180°–181° C. Then, the product was placed in a heat decomposing reactor and decomposed at 160° C. under a stream of dry nitrogen. The generated gaseous formaldehyde was absorbed in toluene maintained in a bath at −20° C. to give a solution containing about 10% of formaldehyde. To the solution was added 0.01 mol percent of phenylisonitrile and it was caused to polymerize. After 4 hours, the polymer was treated with methanol, thoroughly washed with acetone and dried to give white powder in 80% yield. This polymer was further esterified with acetic anhydride at 130° C. in the presence of pyridine. The esterified polymer, characterized by a solution viscosity of 3.16 and a primary decomposing constant at 222° C. ($K_{222}$) of 0.12%/min. produced a strong sheet when heated and pressed.

EXAMPLE 2

A mixture of 50 parts of commercial paraformaldehyde previously washed with dry methanol and dried, 25 parts of 2-methoxyethyl acetate and 0.034 part of diethyl sulfate was heated at 100° C. in a sealed tube. After 20 hours the reaction mixture was washed with methanol, poured into 100 ml. of 10% aqueous sodium sulfite and warmed to 50° C. The resulting precipitate was filtered with suction, thoroughly washed with water and methanol and dried to give 31.5 parts of the desired modified polyoxymethylene with a viscosity of 0.71. This modified product was added to 200 parts of diethyl phthalate and decomposed by heating at 160° C. under a stream of gaseous nitrogen. The generated gaseous formaldehyde was sent to a polymerization reactor and bubbled through 300 parts of dry n-heptane containing 0.002% by weight of tri-n-butylamine maintained at −20° C. The mixture was then warmed to ambient temperature for completing the polymerization. The resulting polymer was thoroughly washed with a n-heptane and dried in vacuo at 50° C. for 8 hours to give 24 parts of white powder of the polymer with a viscosity of 2.36 and the primary decomposition constant at 222° C. of 2.1%/min. Five parts of the product was further acetylated at 130° C. for 5 hours using a mixture of 15 parts of pyridine and 100 parts of acetic anhydride containing 0.1% of di-β-naphthyl paraphenylenediamine. The product with a primary heat decomposition constant ($K_{222}$) of 0.07%/min. gave a strong film when heated and pressed.

EXAMPLE 3

A mixture of 100 parts of paraformaldehyde, obtained by soaking a commercial paraformaldehyde (85% purity) in glacial acetic acid at 50° C. for about 24 hours, filtering with suction and thoroughly washing with dry ether, 50 parts of methylcyclohexane and 0.157 part of p-chlorosulfinic acid was prepared in a pressure tube. The air in the tube was replaced with dry nitrogen. The tube was sealed in vacuo and heated at 100° C. for 20 hours. The contents of the tube when treated as in Example 1, gave 56 parts of white powder of polyoxymethylene with a solution viscosity of 0.66.

Thereafter, the product was placed in a heat decomposing reactor and stirred and heated at 160° C. for effecting decomposition. The generated gaseous formaldehyde was mixed with a stream of nitrogen and bubbled through a solution containing 0.01 mol percent of triphenylphosphine in toluene and caused to polymerize at temperatures from −20° C. to ambient temperature. The resulting polymer had a solution viscosity of 2.17 and produced a film of excellent quality after acetylation thereof.

EXAMPLE 4

A mixture of 10 parts of paraformaldehyde treated with acetic anhydride as in Example 3, 5 parts of toluene and 0.011 part of o-sulfobenzoic anhydride was prepared in a pressure tube. The tube was sealed in vacuo and heated at 100° C. for 20 hours. Treating the product as in Example 1 gave 7.1 parts of the modified polyoxymethylene with a viscosity of 0.54 in the solution. This product was mixed with 0.1% of phosphoric anhydride and decomposed by stirring and heating at 100° C. The generated formaldehyde was caused to polymerize as in Example 2 to give 5.1 parts of polyoxymethylene with high molecular weight, and a viscosity of 2.71.

EXAMPLE 5

As in Example 4, a mixture of 10 parts of paraformaldehyde previously treated with acetic anhydride, 5 parts of methylcyclohexane and 0.161 part of benzenesulfinic anhydride was prepared in a pressure tube, which was sealed in vacuo, and heated at 80° C. for 20 hours. The contents were then treated as in Example 1 to give 4.8 parts of a modified product with a viscosity of 0.64. From this product, there was obtained 3.2 parts of polyoxymethylene with a viscosity of 1.62 through the treatment as in Example 2, including decomposition and polymerization. The resulting polymer was acetylated as usual, mixed with 0.2% of malonamide and heated and pressed to yield an excellent film.

EXAMPLE 6

A mixture of 20 parts of paraformaldehyde of 97% purity, 40 parts of toluene and 0.22 part of methyl p-toluene-sulfonate was placed in a pressure tube, which was sealed under a stream of nitrogen and heated at 120° C. for 10 hours. Thereafter, the tube was opened, and the solid was filtered, washed with dry diethyl ether and dried. The product was then placed in a decomposing reactor and decomposed at 140° C. under a stream of vaporized toluene. The generated gaseous formaldehyde was absorbed in 200 parts of toluene at −30° C. and mixed with 0.05 part of dimethylbenzylamine as catalyst and caused to polymerize at temperatures from −10° to 10° C. After 5 hours, the resulting polymer was separated and washed with acetone to give 14 parts of white powder of polyoxymethylene. The product had a viscosity of 1.51 and $K_{222}$ of 2.4%/min., which further decreased to 0.13%/min. when acetylated as usual.

EXAMPLE 7

A mixture of 50 parts of commercial paraformaldehyde of 95% purity, 80 parts of cyclohexane and 0.02 part of methyl p-toluenesulfonate was placed in a pressure tube, which was sealed under a stream of nitrogen and heated at 120° C. for 10 hours. Thereafter, the tube was opened, and the solid was filtered, washed with cyclohexane and dried in vacuo at 60° C. The product was then placed in a decomposing reactor and decomposed at 140° C. under a stream of vaporized toluene.

The generated gaseous formaldehyde was absorbed in 400 parts of toluene at −30° C. and mixed with 0.05 part of cyclohexylisonitrile as catalyst and caused to polymerize at temperatures from −10° to 10° C.

After 5 hours, the resulting polymer was separated and washed with acetone to give 43 parts of white powder of polyoxymethylene.

The product had a viscosity of 1.37 and $K_{222}$ of 3.1%/min., which further decreased to 0.08%/min. when acetylated as usual.

EXAMPLE 8

Paraformaldehyde was treated with a variety of oxidized derivatives of sulfur, separated, washed, dried and decomposed by heating. The resulting formaldehyde was caused to polymerize to give polyoxymethylenes. The results are summarized in Table I.

TABLE I

| | Modification treatment | | | | | | Polymers | | |
|---|---|---|---|---|---|---|---|---|---|
| | Catalyst, percent | Solvent, percent | Temp., °C. | Time, hrs. | Washing | Insoluble parts in 10% Na$_2$SO$_3$ aq. solution | Yield, percent | Viscosity | $K_{222}$, percent min. |
| 8 | Benzyl-p-chlorobenzene sulfonate, 0.2. | Kerosene, 100. | 100 | 20 | Toluene acetone. | 75 | 80 | 1.99 | 2.2 |
| 9 | Diethylsulfate, 0.1 | Kerosene, 200. | 140 | 10 | ...do... | 82 | 82 | 1.82 | 2.3 |
| 10 | Ethyl-toluene-thiosulfonate 0.5 | Kerosene, 100. | 160 | 5 | ...do... | 80 | 91 | 2.18 | 2.2 |
| 11 | Toluene-sulfinic acid, 2.0 | ...do... | 150 | 10 | ...do... | 70 | 80 | 1.68 | 3.1 |
| 12 | Benzenesulfinyl chloride, 0.05 | ...do... | 100 | 10 | ...do... | 55 | 75 | 1.51 | 3.1 |
| 13 | Ethanesulfonic acid, 0.1 | ...do... | 100 | 5 | ...do... | 61 | 75 | 1.61 | 2.7 |
| 14 | Dimethylsulfite, 0.1 | ...do... | 120 | 10 | ...do... | 55 | 70 | 1.45 | 3.2 |
| 15 | p-Aminobenzene sulfonic acid, 0.1. | Diphenyl-ether, 100 | 120 | 10 | ...do... | 62 | 70 | 1.31 | 3.2 |
| 16 | None | Kerosene, 100. | 120 | 10 | Toluene | 2 | 65 | | (¹) |
| 17 | Not treated | | | | | 0 | 65 | | (¹) |

¹ Very large.

What we claim is:

1. A process for producing a polyoxymethylene having excellent thermal stability and a high average molecular at least one catalyst of weight which comprises heating paraformaldehyde in a closed system for 0.5–24 hrs. in an inert organic solvent at a temperature of 50°–200° C. in the presence of a catalyst in an amount of 0.0001 to 5% by weight of the paraformaldehyde to produce a modified polyoxymethylene of greater molecular weight with an intrinsic viscosity of between 0.4 and 0.8, said catalyst comprising at least one compound selected from the group consisting of compounds having Formulas A and B:

(A)

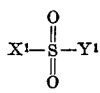

wherein $X^1$ represents $R_1-$, $R_1O-$, $R_1NH-$, $R_1R_2N-$ and $Y^1$ represents

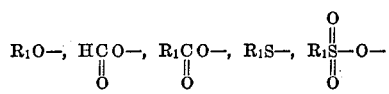

wherein $R_1$ and $R_2$ are independently selected from the group consisting of alkyl group, aryl group, aralkyl group, members of said groups being substituted with at least one organic functional group constituted of at least one element selected from the group consisting of Cl, N, O and S, and wherein $X^1$ and $Y^1$ may form a ring;

(B) 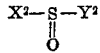

wherein $X^2$ represents $R_1-$ or $R_2O-$, and $Y^2$ represents —OH, —$OR_3$ or

when $X^2$ is $R_1-$, and $Y^2$ represents —$OR_5$ or halogen when $X^2$ is $R_2O$, wherein $R_1$, $R_2$, $R_3$ and $R_5$ are independently selected from the group consisting of alkyl group, aryl group, aralkyl group, members of said groups being substituted with at least one organic functional group constituted of at least one element selected from the group consisting of H, Cl, N, O, S, and C, $R_4$ is selected from the group consisting of aryl group and aryl group substituted with said organic functional group, when $Y^2$ is

$R_1$ and $R_4$ are the same, and when $Y^2$ is halogen, there is excluded from the definition of $R_2$ aryl groups and aryl groups substituted with said organic functional group, and $X^2$ and $Y^2$ may form a ring subjecting the thusly modified polyoxymethylene to pyrolysis to produce gaseous formaldehyde and thereafter subjecting the gaseous formaldehyde to polymerization.

2. A process as claimed in claim 1, wherein the heating of the paraformaldehyde is effected at a temperature of 80°–160° C.

3. A process as claimed in claim 1, wherein pyrolysis is effected at a temperature of 100°–200° C.

4. A process as claimed in claim 1, wherein the paraformaldehyde contains at most 6% by weight of water.

5. A process as claimed in claim 4 wherein the paraformaldehyde contains at most 3% by weight of water.

References Cited

UNITED STATES PATENTS

| | | | |
|---|---|---|---|
| 2,947,727 | 8/1960 | Bartz | 260—67 |
| 3,000,960 | 9/1961 | Wheeler et al. | 260—606 |
| 3,183,270 | 5/1965 | Evers et al. | 260—606 |
| 3,169,840 | 2/1965 | Wood | 55—29 |

WILLIAM H. SHORT, *Primary Examiner.*

L. M. PHYNES, *Assistant Examiner.*

U.S. Cl. X.R.

260—606, 615.5